United States Patent
Zhong et al.

(10) Patent No.: US 10,635,893 B2
(45) Date of Patent: Apr. 28, 2020

(54) IDENTITY AUTHENTICATION METHOD, TERMINAL DEVICE, AND COMPUTER-READABLE STORAGE MEDIUM

(71) Applicant: Baidu USA LLC, Sunnyvale, CA (US)

(72) Inventors: Zhenyu Zhong, Sunnyvale, CA (US); Tao Wei, Sunnyvale, CA (US); Zhebin Qiu, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 116 days.

(21) Appl. No.: 15/799,512

(22) Filed: Oct. 31, 2017

(65) Prior Publication Data

US 2019/0130172 A1 May 2, 2019

(51) Int. Cl.
*G06K 9/00* (2006.01)
*G06F 21/32* (2013.01)
(Continued)

(52) U.S. Cl.
CPC ........ *G06K 9/00288* (2013.01); *G06F 21/32* (2013.01); *G06K 9/00221* (2013.01);
(Continued)

(58) Field of Classification Search
None
See application file for complete search history.

(56) References Cited

U.S. PATENT DOCUMENTS 6,101,264 A * 8/2000 Wagner ............ G06K 9/00335
382/115

6,219,639 B1 * 4/2001 Bakis ................ G06K 9/00885
382/116

(Continued)

FOREIGN PATENT DOCUMENTS

| JP | 2012-103792 A | 5/2012 |
|---|---|---|
| JP | 2015-169977 A | 9/2015 |
| KR | 10-2017-0045093 A | 4/2017 |

OTHER PUBLICATIONS

Noda, Kuniaki, et al. "Audio-visual speech recognition using deep learning." Applied Intelligence 42.4 (2015): 722-737. (Year: 2015).*

(Continued)

*Primary Examiner* — Andrae S Allison
(74) *Attorney, Agent, or Firm* — Seed IP Law Group LLP

(57) ABSTRACT

Embodiments of the present disclosure disclose an identity authentication method, a terminal device, and a computer-readable storage medium. An embodiment of the method comprises: acquiring video data displaying a lip part mouth shape changing process of a user; parsing the video data to generate annotation information of a human face region displayed by each image in consecutive images constituting the video data and human face feature information corresponding to each image in the consecutive images; generating a lip part feature information sequence and a human face local part feature information sequence based on the generated annotation information and the consecutive images; and transmitting the generated human face feature information, the lip part feature information sequence, and the human face local part feature information sequence to a server, and receiving an identity verification result returned from the server. The embodiment enhances identity authentication security.

10 Claims, 6 Drawing Sheets

(51) Int. Cl.
G06K 9/62 (2006.01)
H04L 29/06 (2006.01)
G10L 17/22 (2013.01)

(52) U.S. Cl.
CPC ..... *G06K 9/00268* (2013.01); *G06K 9/00335* (2013.01); *G06K 9/00744* (2013.01); *G06K 9/00892* (2013.01); *G06K 9/00906* (2013.01); *G06K 9/6273* (2013.01); *G10L 17/22* (2013.01); *H04L 63/0861* (2013.01); *G06K 9/6256* (2013.01)

(56) References Cited

U.S. PATENT DOCUMENTS

| | | | | |
|---|---|---|---|---|
| 9,627,532 | B2* | 4/2017 | Gemello | H01L 29/66636 |
| 2002/0007462 | A1* | 1/2002 | Omata | G06F 21/34 |
| | | | | 726/21 |
| 2002/0178344 | A1* | 11/2002 | Bourguet | G06F 9/542 |
| | | | | 712/1 |
| 2008/0043144 | A1* | 2/2008 | Amir | G06K 9/00711 |
| | | | | 348/469 |
| 2011/0227931 | A1* | 9/2011 | Lu | G06T 13/205 |
| | | | | 345/473 |
| 2011/0235870 | A1 | 9/2011 | Ichikawa et al. | |
| 2013/0226587 | A1* | 8/2013 | Cheung | G06K 9/00335 |
| | | | | 704/273 |
| 2017/0244701 | A1* | 8/2017 | Su | G06F 3/04883 |

OTHER PUBLICATIONS

Usman Saeed, Lip Analysis for Person recognition,Usman Saeed. Lip Analysis for Person recognition. Signal and Image processing. Telecom ParisTech, 2010. English. (Year: 2010).*
Wolff, Gregory J., et al. "Lipreading by neural networks: Visual preprocessing, learning, and sensory integration." Advances in neural information processing systems. 1994. (Year: 1994).*
Garg, Amit, Jonathan Noyola, and Sameep Bagadia. Lip reading using CNN and LSTM. Technical report, Stanford University, CS231n project report, 2016. (Year: 2017).*
Shubhangi et al, Lip's Movements Biometric Authentication in Electronic Devices, Proceedings of the IEEE 2017 International Conference on Computing Methodologies and Communication (Year: 2017).*
Frischholz et al., "BioID: A Multimodal Biometric Identification System," *Computer* 33(2):64-68, 2000.
Ross et al., "Multimodal Biometrics: An Overview," *12th European Signal Processing Conference* (*EUSIPCO*), Vienna, Austria, Sep. 6-10, 2004, pp. 1221-1224.
Korean Office Action dated Apr. 17, 2019 for Korean Application No. 10-2018-0068998, 8 pages.

* cited by examiner

IDENTITY AUTHENTICATION METHOD, TERMINAL DEVICE, AND COMPUTER-READABLE STORAGE MEDIUM

TECHNICAL FIELD

Embodiments of the present disclosure relate to the field of computer technologies, specifically to the field of Internet technologies, and more particularly to an identity authentication method, a terminal device, and a computer-readable storage medium.

BACKGROUND

With the development of global economy and information technologies and the advent of global Internet era, a reliable identity authentication is needed in more and more fields. Under the background of informatization, it becomes a significant challenge how to accurately verify an identity of a person and ensure information security in an information era.

Existing approaches usually perform identity authentication using passwords, keys or human face recognition technologies; however, the passwords and keys are easily forgotten by users, while human face features as the basis for the human recognition technologies are easily forged by pictures or videos or the like.

SUMMARY

Embodiments of the present disclosure provide an identity authentication method, a terminal device, and a computer-readable storage medium.

In a first aspect, an embodiment of the present disclosure provides an identity authentication method, the method comprising: acquiring video data displaying a lip part mouth shape changing process of a user; parsing the video data to generate annotation information of a human face region displayed by each image in consecutive images constituting the video data and human face feature information corresponding to each image in the consecutive images; generating a lip part feature information sequence and a human face local part feature information sequence based on the generated annotation information and the consecutive images; transmitting the generated human face feature information, the lip part feature information sequence, and the human face local part feature information sequence to a server, and receiving an identity verification result returned from the server.

In some embodiments, the acquiring video data displaying a lip part mouth shape changing process of a user comprises: displaying first prompt information for prompting the user to perform identity authentication, photographing a face part of the user to acquire the video data displaying the lip part mouth shape changing process of the user, and acquiring voice data of the user.

In some embodiments, the first prompt information includes a Pronounce option; the method further comprises: parsing the voice data in response to determining that the user performs a click operation on the Pronounce option to generate voiceprint feature information; and transmitting the voiceprint feature information to the server.

In some embodiments, the annotation information includes positions of critical points of the human face region and a position of the human face region; and the generating a lip part feature information sequence and a human face local part feature information sequence based on the generated annotation information and the consecutive images comprises: inputting the generated annotation information and the consecutive images into a pre-trained neural network to obtain the lip part feature information sequence and the human face local part feature information sequence, which correspond to the consecutive images, wherein the neural network is for extracting lip part feature information successively from a plurality of images to generate the lip part feature information sequence, and extracting human face local part feature information successively from the plurality of images to generate the human face local part feature information sequence.

In some embodiments, the human face local part feature information sequence includes at least one of: a face part feature information sequence, an eye feature information sequence, a nose feature information sequence, an eyebrow feature information sequence, a jaw feature information sequence, an oral cavity feature information sequence, and a tongue part feature information sequence.

In some embodiments, the lip part feature information in the lip part feature information sequence includes: central coordinate of a lip, direction of the lip, an inner lip width, an outer lip width, an outer lip upper edge height, an inner lip upper edge height, an inner lip lower edge height, an outer lip lower edge height, an offset amount of a quartic curve center from a coordinate origin, an offset distance of the upper lip part quartic curve from a parabola, and an offset distance of the lower lip part quartic curve from the parabola.

In some embodiments, prior to acquiring video data displaying a lip part mouth shape changing process of a user, the method further comprises: displaying second prompt information prompting the user to set a code word and acquiring target video data displaying the lip part mouth shape changing process of the user; parsing the target video data to generate target annotation information of the human face region displayed by each image in target consecutive images constituting the target video data and target human face feature information corresponding to each image in the target consecutive images; generating a target lip part feature information sequence and a target human face local part feature information sequence based on the generated target annotation information and the target consecutive images; and transmitting the generated target human face feature information, target lip part feature information sequence, and the target human face local part feature information sequence to the server.

In some embodiments, the displaying second prompt information prompting the user to set a code word and acquiring target video data displaying the lip part mouth shape changing process of the user comprises: displaying the second prompt information that prompts the user to set the code word, photographing the face part of the user to acquire target video data displaying the lip part mouth shape changing process of the user, and acquiring the target voice data of the user.

In some embodiments, the second prompt information includes a Pronounce option; the method further comprises: parsing the target voice data in response to determining that the user performs a click operation on the Pronounce option in the second prompt information to generate target voiceprint feature information; and transmitting the target voiceprint feature information to the server.

In some embodiments, the target annotation information includes the positions of critical points of the human face region and the position of the human face region; and the generating a target lip part feature information sequence and a target human face local part feature information sequence based on the generated target annotation information and the target consecutive images comprises: inputting the generated target annotation information and the target consecutive images into the pre-trained neural network, respectively, obtaining the target lip part feature information sequence and the target human face local part feature information sequence corresponding to the target consecutive images.

In a second aspect, embodiments of the present disclosure provide an identity authentication method, the method comprising: receiving an identity authentication request transmitted by a client, wherein the identity authentication request includes a user's human face feature information, lip part feature information sequence, human face local part feature information sequence, the human face feature information, lip part feature information sequence, and the human face local part feature information sequence being generated by the client based on parsing of the video data displaying the user's lip part mouth shape changing process; extracting preset target human face feature information, target lip part feature information sequence, and target human face local part feature information sequence of the user; generating an identity authentication result characterizing whether the user passes identity authentication based on matching results of the human face feature information, the lip part feature information sequence, and the human face local part feature information sequence with the target human face feature information, the target lip part feature information sequence, and the target human face local part feature information sequence; and transmitting the identity authentication result to the client.

In some embodiments, the generating an identity authentication result characterizing whether the user passes identity authentication based on matching results of the human face feature information, the lip part feature information sequence, and the human face local part feature information sequence with the target human face feature information, the target lip part feature information sequence, and the target human face local part feature information sequence comprises: generating an identity authentication result characterizing that the user passes the identity authentication when the following three conditions are simultaneously satisfied: the human face feature information matches the target human face feature information; the lip part feature information sequence matches the target lip part feature information sequence; and the human face local part feature information sequence matches the target human face local part feature information sequence.

In some embodiments, the identity authentication request further comprises voiceprint feature information of the user; and the generating an identity authentication result characterizing whether the user passes identity authentication based on matching results of the human face feature information, the lip part feature information sequence, and the human face local part feature information sequence with the target human face feature information, the target lip part feature information sequence, and the target human face local part feature information sequence comprises: extracting preset target voiceprint feature information of the user; and generating the identity authentication result characterizing that the user passes the identity authentication when the following four conditions are simultaneously satisfied: the human face feature information matches the target human face feature information; the lip part feature information sequence matches the target lip part feature information sequence; the human face local part feature information sequence matches the target human face local part feature information sequence; and the voiceprint feature information matches the target voiceprint feature information.

In some embodiments, prior to receiving the identity authentication request transmitted by the client, the method further comprises: receiving an identity setting request transmitted by the client, wherein the identity setting request includes the user's target human face feature information, target lip part feature information sequence, and target human face local part feature information sequence, the target human face feature information, the target lip part feature information sequence, and the target human face local part feature information sequence being generated by the client based on the parsing of the target video data displaying the lip part mouth shape changing process of the user; and storing the target human face feature information, the target lip part feature information sequence, and the target human face local part feature information sequence.

In some embodiments, the identity setting request further includes the user's target voiceprint feature information, wherein the target voiceprint feature information is generated by the client based on parsing of the user's voice data; and the storing the target human face feature information, the target lip part feature information sequence, and the target human face local part feature information sequence comprises: storing the target voiceprint feature information, the target human face feature information, the target lip part feature information sequence, and the target human face local part feature information sequence.

In a third aspect, an embodiment of the present application provides a terminal device, comprising: one or more processors; a storage storing one or more programs which, when being executed by the one or more processors, cause the one or more processors to implement the identity authentication method described according to any embodiment in the first aspect.

In a fourth aspect, an embodiment of the present application provides a computer-readable storage medium having a computer program embodied thereon, wherein the computer program, when being executed by a processor, causes the processor to implement the identity authentication method described according to any embodiment in the first aspect.

By parsing the acquired video data displaying the user lip part mouth shape changing process to generate annotation information of a human face region displayed by each image in consecutive images constituting the video data and human face feature information corresponding to each image in the consecutive images, generating a lip part feature information sequence and a human face local part feature information sequence based on the generated annotation information and consecutive images, transmitting the generated human face feature information, lip part feature information sequence and human face local part feature information sequence to the server, and receiving an identity authentication result returned by the server, the identity authentication method provided by the embodiments of the present disclosure may perform user identity authentication in conjunction with facial recognition of a human face, recognition of mouth shape motions when the user uses the lip language, and recognition of face local part behaviors. It is difficult for a hacker to imitate the mouth shape motions and the face part behaviors because these are biometrics unique to the user when he uses lip language, and thus the security of identity authentication is enhanced.

BRIEF DESCRIPTION OF THE DRAWINGS

Other features, objectives and advantages of the present application will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and embodiments. It will be appreciated that the preferred embodiments described herein are only for explaining the present disclosure, not for limiting the present disclosure. In addition, it should also be noted that for the ease of description, the drawings only illustrate those parts related to the present disclosure.

It should be noted that without conflict, the embodiments in the present disclosure and features in the embodiments may be combined mutually. Hereinafter, the present disclosure will be illustrated in detail with reference to the accompanying drawings in conjunction with the embodiments.

Figure 1:
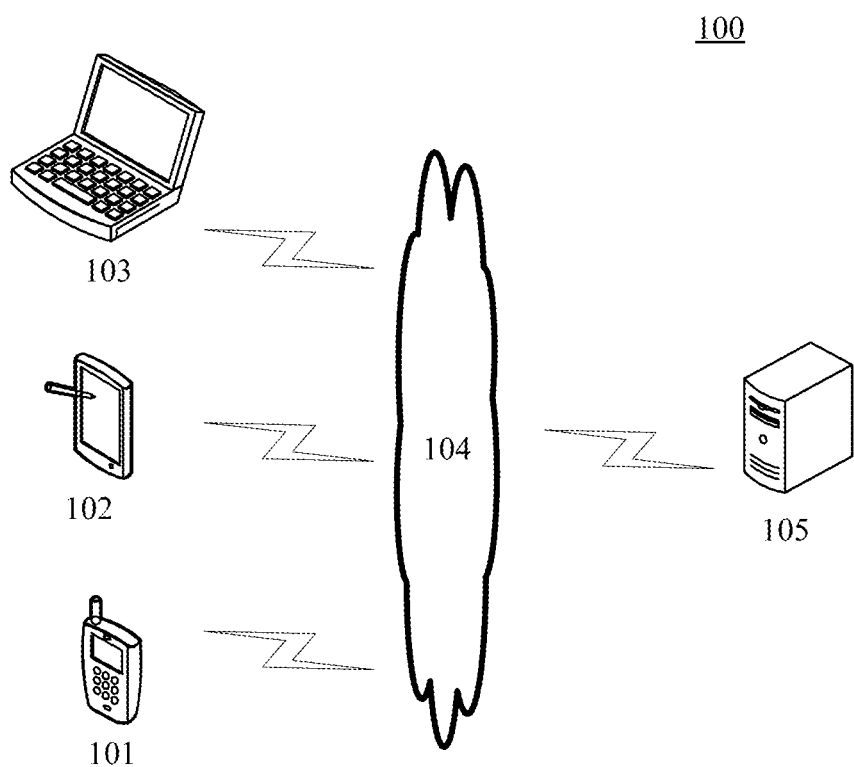
FIG. 1 is an exemplary system architecture diagram in which the present disclosure may be applied.

FIG. 1 shows an exemplary system architecture 100 in which the embodiments of an identity authentication method of the present disclosure may be applied.

As illustrated in FIG. 1, the system architecture 100 may comprise electronic devices 101, 102, and 103, a network 104, and a server 105. The network 104 is a medium for providing a communication link between the electronic devices 101, 102, 103 and the server 105. The network 104 may include various kinds of connection types, e.g., a wired communication link, a wireless communication link, or an optical cable, etc.

The user may interact with the server 105 using the terminal devices 101, 102, 103 over the network 104, to receive or transmit messages, etc. The terminal devices 101, 102, and 103 may be installed with various kinds of communication client applications, e.g., a webpage browser application, a shopping application, a search application, an instant messaging tool, an email client, and social platform software, etc.

The terminal devices 101, 102, 103 may be various kinds of electronic devices that have a camera device and a display screen, and support network transmission, including, but not limited to, a smart phone, a tablet computer, an e-book reader, an MP3 (Moving Picture Experts Group Audio Layer III) player, an MP4 (Moving Picture Experts Group Audio Layer IV) player, a laptop computer, and a tablet computer, etc.

The server 105 may be a server that provides various kinds of services, e.g., a background server that provides identity authentication for a user using the terminal device 101, 102, 103. The background server may perform jobs such as analysis and matching to the received information (e.g., human face feature information, the lip part feature information sequence, the human face local part feature information sequence, etc.), and reports back a processing result (e.g., an identity authentication result) to the terminal device. Here, the server 105 is not limited to a physical server, but also may be a cloud server.

It needs to be noted that the identity authentication method provided by the embodiments of the present disclosure is generally executed by the server 105.

It should be understood that the numbers of terminal devices, networks, and servers in FIG. 1 are only schematic. Any numbers of electronic devices, networks, and servers may be provided according to needs of implementation.

Figure 2:
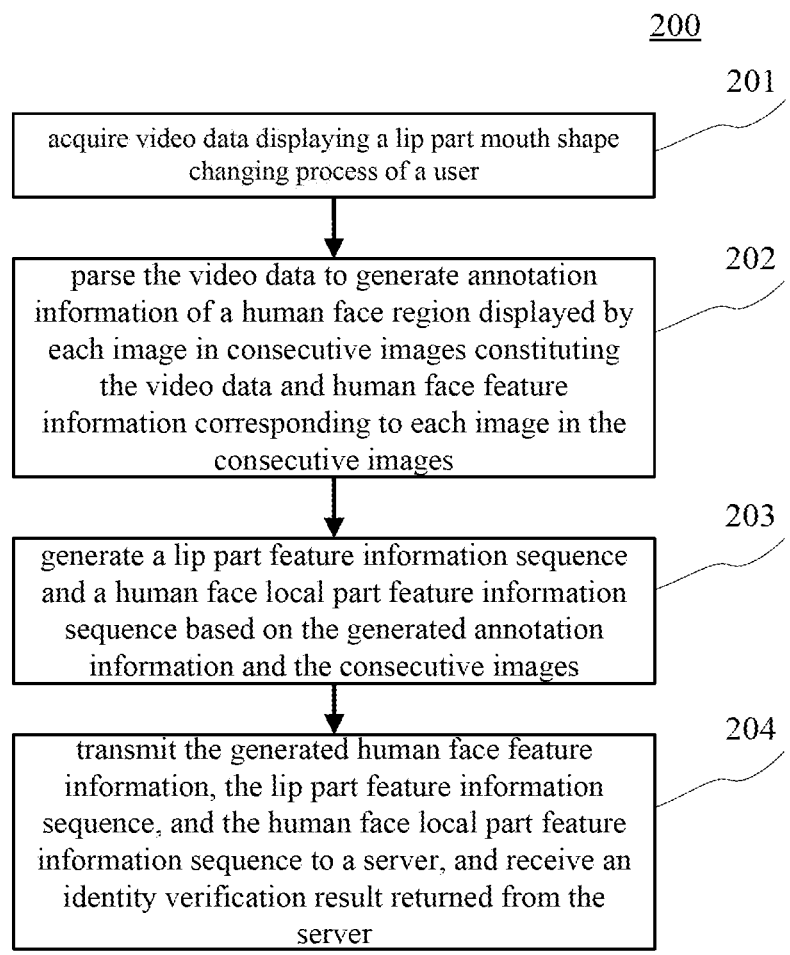
FIG. 2 is a flow diagram of an embodiment of an identity authentication method according to the present disclosure.

Continue referring to FIG. 2, which shows a flow 200 of an embodiment of an identity authentication method according to the present disclosure. The identity authentication method comprises steps of:

Step 201: acquiring video data displaying a lip part mouth shape changing process of a user.

In the present embodiment, an electronic device (e.g., terminal device 101, 102, 103 shown in FIG. 1) on which the identity authentication method is executed may be provided with a camera device, e.g., a camera. The electronic device may turn on the camera device to acquire videos so as to acquire the video data displaying the lip part mouth shape changing process of the user. Here, the video data refers to consecutive image sequences, which is substantively composed of groups of consecutive images.

In practice, the electronic device may display in real time each frame image acquired during a video acquisition process. The user may adjust a position of his/her head or a position of the electronic device based on the video image displayed on the electronic device, such that the video acquired by the electronic device displays a face region of the user. Besides, during the video acquisition process, the user may say a preset code word (e.g., a phrase, any sentence, or several utterances, etc.) in a Pronounced or Unpronounced mode (lip language), such that the video data acquired by the electronic device displays the mouth shape process of the user's lip part.

Step 202: parsing the video data to generate annotation information of a human face region displayed by each image in consecutive images constituting the video data and human face feature information corresponding to each image in the consecutive images.

In the present embodiment, the electronic device may parse the video data to generate annotation information of a human face region displayed by each image in consecutive images constituting the video data and human face feature information corresponding to each image in the consecutive images. Particularly, the annotation information may include information such as positions in the human face region (which may be represented by coordinate values) of various organs (e.g., eyes, eyebrow, noise, mouth, chin, etc.) in the human face region in the image, and positions of the human face region in the image, etc. It needs to be noted that the human face feature information may be the information for characterizing human face features in the image, wherein the human face feature may refer to various kinds of basic elements associated with the human face. For example, the basic elements include, but not limited to, positions of various organs in the human face in the human face region of the image, structural relationships between various organs in the human face, and Euclidean distances, curvatures, and angles between multiple points, etc. In practice, the human face feature information may be represented by vectors or matrices.

It needs to be noted that the electronic device may detect the consecutive images using various kinds of human face detection approaches to generate the annotation information of the human face region and the human face feature information. As an example, the electronic device may input the consecutive images into a pre-trained convolutional neural network (CNN) for human face detection, obtaining annotation information of the human face region displayed by each image in the consecutive images outputted by the convolutional neural network and the human face feature information corresponding to the image. It needs to be noted that the convolutional neural network may be derived by the electronic device performing supervised training to an existing deep convolutional neural network (e.g., DenseBox, VGGNet, ResNet, SegNet, etc.) using a deep learning method and training samples, wherein the training samples may include mass images and annotations to respective images, e.g., annotations for indicating whether an image is a human face region, annotations for indicating a position of the human face region (e.g., a coordinate value, etc.), annotations for indicating whether the images are respective organs in the human face, and annotations for indicating positions of respective organs in the human face region, etc. Here, the annotation information and the human face feature information may be represented with vectors or matrices.

In practice, a convolutional neural network is a feedforward neural network, whose artificial neurons may respond to surrounding cells within a certain coverage and have an outstanding performance in image processing. Therefore, the convolutional neural network may be utilized to perform human face feature extraction and human face detection. The convolutional neural network may include at least one convolutional layer and at least one pooling layer, wherein the convolutional layer may be used for extracting image features, and the pooling layer may be used for downsampling the input information. It needs to be noted that it is a known technology that is currently studied and exploited widely to perform human face detection and feature extraction using the convolutional neural network, which is thus not omitted here.

Step 203: generating a lip part feature information sequence and a human face local part feature information sequence based on the generated annotation information and the consecutive images.

In the present embodiment, the electronic device may generate a lip part feature information sequence and a human face local part feature information sequence based on the generated annotation information and the consecutive images. Specifically, the annotation information corresponding to each image of the consecutive images may be first subjected to processing such as extraction, computation, and summing; then, the processed annotation information is determined as the lip part feature information of the image and the human face local part feature information; finally, the determined lip part feature information corresponding to respective images is successively summed into a lip part feature information sequence, and the determined human face local part feature information corresponding to respective images is successively summed into the human face local part feature information sequence. As an example, because the generated annotation information may include information such as the positions of respective organs in the human face region in the image and the position of the human face in the image, the electronic device may extract the annotation information (e.g., the coordinates of the positions such as a mouth corner, a lip peak, etc.) associated with the lip part in the annotation information of each image in the consecutive images, and perform calculation and summing (e.g., calculating the width and height of the lip part) with the extracted annotation information as the lip part feature information to generate a lip part feature information sequence. Meanwhile, the electronic device may extract the annotation information associated with human face local parts (e.g., one or more of eyes, nose, face part, eyebrow, chin, oral cavity, and tongue) in the annotation information of each image in the consecutive images, and perform calculation and summing to the extracted annotation information to generate a human face local part feature information sequence. In practice, the human face local part feature information sequence may be one or more; in the case of more, each human face local part feature information sequence may correspond to one human face local part.

It needs to be noted that the lip part feature information may be information for characterizing lip part features, wherein the lip part features may be various basic elements associated with the lip part region in the human face region, e.g., they may include, but not limited to, coordinate values of a plurality of positions (e.g., mouth corners, lip peaks, etc.) of the user's lip part, and dimensions of the lip part (e.g., width, height, thickness, etc., of the lip part). The lip part feature information sequence may be a sequence sequentially constituted of lip part feature information corresponding to respective images in the consecutive images. In practice, the lip part feature information may be represented by a vector or a matrix.

It needs to be noted that the human face local part feature information refers to information for characterizing human face local features, wherein the human face local features may be various kinds of basic elements associated with local parts in the human face (e.g., eyes, nose, chin, eyebrow, oral cavity, tongue, face part, etc.), which, for example, may include, but not limited to, a position of a certain local part in the human face in the human face region of the image, and an Euclidean distance, a curvature, and an angle of a critical point of a certain local part in the human face, etc. The human face local part feature information sequence may be a sequence sequentially constituted of the human face local part feature information corresponding to respective images in the consecutive images. In practice, the human face local part feature information may be represented by a vector or matrix.

Step 204: transmitting the generated human face feature information, lip part feature information sequence, and human face local part feature information sequence to a server, and receiving an identity authentication result returned from the server.

In the present embodiment, the electronic device may transmit the generated human face feature information, lip part feature information sequence, and human face local part feature information sequence to a server (e.g., the server 105 shown in FIG. 1), and receive an identity authentication result returned from the server.

In practice, the server may store preset target human face feature information, target lip part feature information sequence, and target human face local part feature information sequence of the user. The target human face feature information, the target lip part feature information sequence, and the target human face local part feature information sequence may be generated by the electronic device based on parsing of the target video data displaying a user lip part mouth shape changing process, wherein the target video data may be video data displaying the lip part mouth shape changing process of the user, which are acquired by the user during a process of code word setting. Here, the code word setting is performed in advance before implementation of the identity authentication method. The server may generate an identity authentication result for characterizing whether the user passes identity authentication based on matching results of the human face feature information, the lip part feature information sequence, and the human face local part feature information sequence with the target human face feature information, the target lip feature information sequence, and the target human face local part feature information sequence, and transmit the identity authentication result to the electronic device. Specifically, the server may generate an identity authentication result characterizing that the user passes identity authentication when the following three conditions are simultaneously satisfied: the human face feature information matches the target human face feature information; the lip part feature information sequence matches the target lip part feature information sequence; and the human face local part feature information sequence matches the target human face local part feature information sequence.

It needs to be noted that the server may receive in advance and store an identity setting request transmitted by the electronic device, wherein the identity setting request may include the target human face feature information, the target lip part feature information sequence, and the target human face local part feature information sequence of the user, which target human face feature information, target lip part feature information sequence, and target human face local part feature information sequence may be generated by the electronic device based on parsing of the target video data displaying the lip part mouth shape changing process of the user.

The server may match the human face feature information, the lip part feature information sequence, and the human face local part feature information sequence with the target human face feature information, the target lip part feature information sequence, and the target human face local part feature information sequence using various kinds of matching modes. As an example, the server may store three neural networks for performing human face recognition, lip part behavior recognition, and human face local part behavior recognition, respectively. The server may input the human face feature information, the lip part feature information sequence, and the human face local part feature information sequence into corresponding neural networks, obtaining a human face recognition result, a lip part behavior recognition result, and a human face local part behavior recognition result outputted by the three neural networks, respectively. It needs to be noted that the three neural networks may be derived by supervised training based on mass training samples using a machine learning method. The training samples used by the neural network for performing human face recognition may include the target human face feature information; the training samples used by the neural network for performing lip part behavior recognition may include the target lip part feature information sequence; and the training samples used by the neural network for performing human face local part behavior recognition may include the target human face local part feature information sequence. It needs to be noted that the number of neural networks for performing the human face recognition, the lip part behavior recognition, and the human face local part behavior recognition is not limited to 3, which may also be one, two or more.

Figure 3:
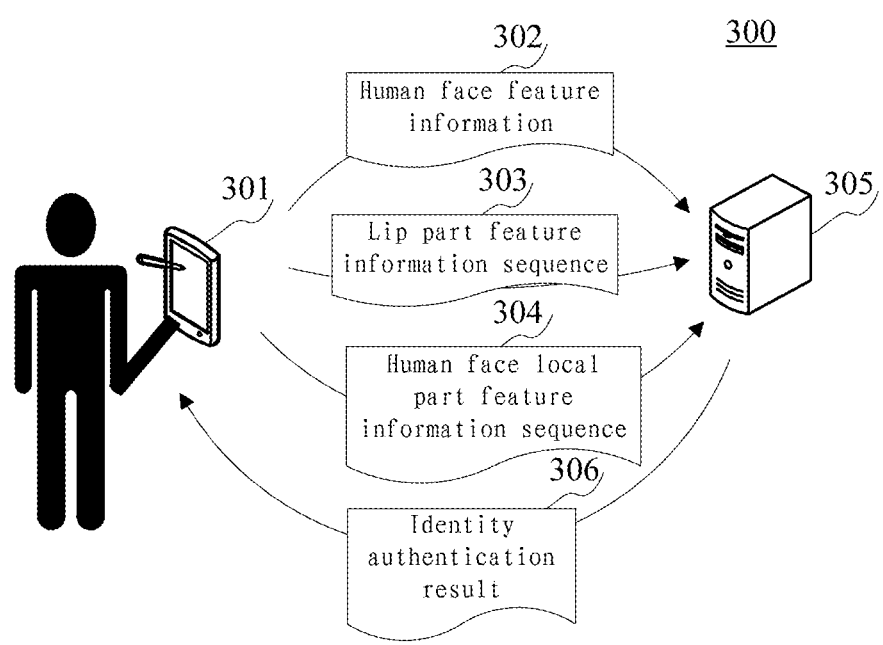
FIG. 3 is a schematic diagram of an application scenario for an identity authentication method according to the present disclosure.

Continue referring to FIG. 3, which is a schematic diagram of an application scenario for the identity authentication method according to the present disclosure. In the application scenario of FIG. 3, the terminal device 301 first acquires video data displaying a lip part mouth shape changing process of a user; then, the terminal device 301 parses the video data to generate annotation information of a human face region displayed by each image in consecutive images of the video data and human face feature information 302 corresponding to each image in the consecutive images; next, the terminal device 301 generates a lip part feature information sequence 303 and a human face local part feature information sequence 304 based on the generated annotation information and the consecutive images; then, the terminal device 301 transmits the generated human face feature information 302, lip part feature information sequence 303, and human face local part feature information sequence 304 to a server 305; and finally, the terminal device 301 receives an identity authentication result 306 returned from the server 305.

By parsing the acquired video data displaying the user lip part mouth shape changing process to generate annotation information of a human face region displayed by each image in consecutive images constituting the video data and human face feature information corresponding to each image in the consecutive images, generating a lip part feature information sequence and a human face local part feature information sequence based on the generated annotation information and consecutive images, transmitting the generated human face feature information, lip part feature information sequence and human face local part feature information sequence to the server, and receiving an identity authentication result returned by the server, the identity authentication method provided by the embodiments of the present disclosure may perform user identity authentication in conjunction with facial recognition of a human face, recognition of mouth shape motions when the user uses the lip language, and recognition of face local part behaviors when the user uses the lip language, i.e., effectively combining multiple factors such as what the user has (i.e., human face feature information), what the user knows (i.e., preset code word), and what the user behaves (i.e., the user's lip part feature information sequence and human face local part feature information sequence when describing the code word); it is difficult for a hacker to imitate the mouth shape motions and the face part behaviors because these are biometrics unique to the user when he uses lip language, and thus the security of identity authentication is enhanced.

Figure 4:
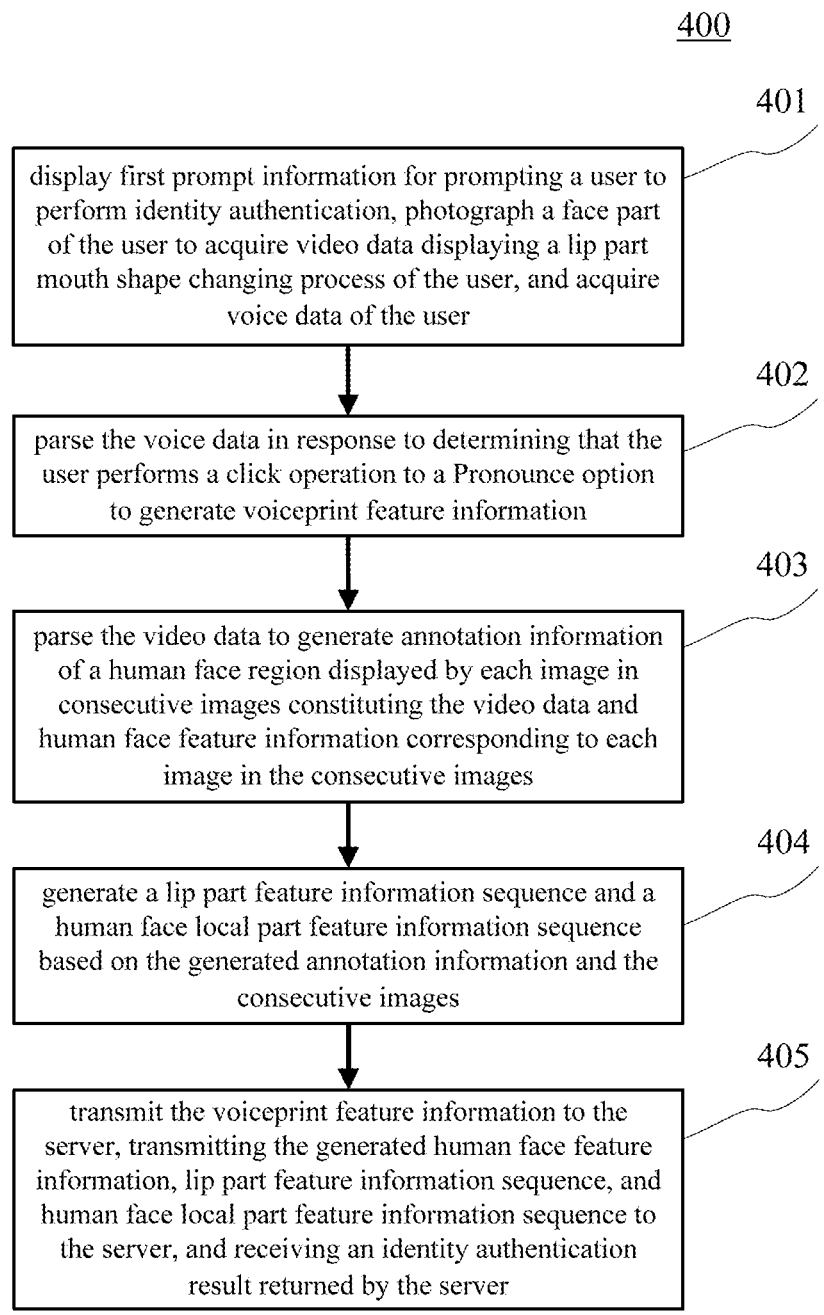
FIG. 4 is a flow diagram of another embodiment of the identity authentication method according to the present disclosure.

Further refer to FIG. 4, which shows a flow 400 of another embodiment of the identity authentication method. The flow 400 of the identity authentication method comprises steps of:

Step 401: displaying first prompt information for prompting a user to perform identity authentication, photographing a face part of the user to acquire video data displaying a lip part mouth shape changing process of the user, and acquiring voice data of the user.

In the present embodiment, an electronic device (e.g., terminal device 101, 102, 103 shown in FIG. 1) on which the identity authentication method is executed may display, in a display screen, the first prompt information for prompting the user to perform identity authentication. Here, the first prompt information may prompt the user to perform identity authentication in a mode of describing a preset code word. The electronic device may be provided with a camera device as well as a device such as a microphone. The electronic device may open the camera device and the microphone to acquire video data and voice data. During this process, the user may adjust a position and an orientation of his/her head or the electronic device, such that the electronic device photographs the facial region of the user, thereby acquiring the video data displaying the mouth shape changing process of the user's lip part.

Step 402: parsing the voice data in response to determining that the user performs a click operation to a Pronounce option to generate voiceprint feature information.

In the present embodiment, the first prompt information may include a Pronounce option that may be used for prompting the user to describe the preset code word in a mode of making a sound. In response to determining that the user performs a click operation on the Pronounce option, the electronic device may parse the voice data using various kinds of voiceprint feature extracting approaches to generate voiceprint feature information. As an example, the electronic device may input the voice data into a pre-trained neural network model for extracting voiceprint features (e.g., the existing DNN-ivector model for extracting voiceprint features or the existing end-to-end deep neural network model for extracting voiceprint features), obtaining voiceprint feature information outputted by the neural network model. The voiceprint feature information may be information for characterizing voiceprint features, wherein the voiceprint features may be various kinds of basic elements associated with voiceprints, e.g., they may include tone, loudness, frequency, and timbre, etc. In practice, the voiceprint feature information may be represented with a vector or matrix. Here, the method of extracting voiceprint feature information using the neural network model is a known technology currently studied and applied widely, which is thus not detailed here.

In practice, the user may click on to the Pronounce option before or after describing the word code. If it is determined that the user clicks on to the Pronounce option, the electronic device may parse the voice data to generate voiceprint feature information; if it is determined that the user does not click on to the Pronounce option, the electronic device may not execute the step of parsing the voice data.

In some optional implementations of the present embodiment, the first prompt information may also include a No-Pronounce option, which No-Pronounce option may be used for prompting the user to describe the code word in a mode of making no sound (i.e., describing with a lip language). If it is determined that the user clicks on to the No-Pronounce option, the electronic device may not execute the step of parsing the voice data.

In some optional implementations of the present embodiment, if the electronic device clicks on to the No-Pronounce option before describing the code word, the electronic device may not perform acquisition of the voice data, but directly photographs the face part of the user, acquiring the video data displaying the lip part mouth shape changing process of the user.

Step 403: parsing the video data to generate annotation information of a human face region displayed by each image in consecutive images constituting the video data and human face feature information corresponding to each image in the consecutive images.

In the present embodiment, the electronic device may parse the video data to generate annotation information of a human face region displayed by each image in consecutive images constituting the video data and human face feature information corresponding to each image in the consecutive images, wherein the annotation information may include positions of critical points of the human face region and a position of the human face region. The critical points may be pre-specified points in the human face having relatively strong semantic information (e.g., points at eye corners, mouth corners, nose wings, brow tip, brow ridge, and contour, etc.). In practice, the number of human face critical points may be 72, or other preset numerical value, which is not limited here. It needs to be noted that the annotation information may also include, but not limited to, information such as types of critical points (e.g., eye corners, mouth corners, nose wings, brow tip, brow ridge, and contour etc.), and a probability for a point being a critical point.

In the present embodiment, the electronic device may input the consecutive images into a pretrained convolutional neural network for human face detection, causing the convolutional neural network to output the annotation information of the human face region displayed by each image in the consecutive images and the human face feature information corresponding to the image. It needs to be noted that the operation of the step 403 is substantially identical to the operation of the step 202, which is not detailed here.

Step 404: generating a lip part feature information sequence and a human face local part feature information sequence based on the generated annotation information and the consecutive images.

In the present embodiment, the electronic device may generate a lip part feature information sequence and a human face local part feature information sequence based on the generated annotation information and the consecutive images. It needs to be noted that the lip part feature information in the lip part feature information sequence may include, but not limited to: a central coordinate of a lip, lip direction, inner lip width, outer lip width, outer lip upper edge height, inner lip upper edge height, inner lip lower edge height, outer lip lower edge height, offset amount of a quartic curve center from the coordinate origin, an offset distance of the upper lip part quartic curve offset from a parabola, and an offset distance of the lower lip part quartic curve offset from the parabola. It needs to be noted that the human face local part feature information sequence may include at least one of: a face part feature information sequence, an eye feature information sequence, a nose feature information sequence, an eyebrow feature information sequence, a chin feature information sequence, an oral cavity feature information sequence, and a tongue part feature information sequence. Here, each part feature information sequence may be information for characterizing the feature of the part. As an example, the eyebrow feature sequence may be information characterizing eyebrow features, wherein the eyebrow features may be various kinds of basic elements associated with the eyebrow, e.g., an eyebrow ridge position, an eyebrow top position, an eyebrow length, an eyebrow width, and an eyebrow height, etc.

In the present embodiment, the electronic device may store a pre-trained neural network, wherein the neural network may be used for extracting lip part feature information sequentially from a plurality of images so as to generate a lip part feature information sequence, and extracting human face local part feature information sequentially from a plurality of images to generate a human face local part feature information sequence. The electronic device may input the generated annotation information and the consecutive images into the neural network, obtaining a lip part feature information sequence and a human face local part feature information sequence which correspond to the consecutive images. In practice, the neural network may be obtained from supervised training using various kinds of existing network structures or models that may extract time-based eigen-sequence. As an example, the network structure or model may be a network structure combining a Deep Neural Network (DNN) and a Hidden Markov Model (HMM), a network structure combining a Convolutional Neural Network (CNN) and a Long Short-Term Memory (LSTM), a network structure combining a Recurrent Neural Network (RNN) and a Connectionist Temporal Classification (CTC) model, and a network structure combining the Recurrent Neural Network and an Attention Model AM, and may also be a network structure combining a Convolutional Neural Network, a Long Short-Term Memory Network, and a Deep Neural Network.

It needs to be noted that the number of pre-trained neural networks may be one or more. As an example, the number of pre-trained neural networks may be one. The neural network may simultaneously extract lip part feature information and human face local part feature information, and generate a lip part feature information sequence and a human face local part feature information sequence. As another example, the number of pre-trained neural networks may be two, which are pretrained first neural network and second neural network, respectively, wherein the first neural network may be used for sequentially extracting the lip part feature information from a plurality of images to generate a lip part feature information sequence, and the second neural network is used for sequentially extracting the human face local part feature information from a plurality of images to generate a human face local part feature information sequence. The electronic device may input the generated annotation information and the consecutive images into the pretrained first neural network and second neural network, obtaining the lip part feature information sequence and the human face local part feature information sequence which correspond to the consecutive images, respectively. Here, the first neural network and the second neural network may be derived by supervised training using same or different network structures or models that may extract time-based eigen-sequence. As another example, the number of the pre-trained neural networks may be no less than 3, wherein one neural network may be used for extracting the lip part feature information, while the remaining respective neural networks may be used for extracting different human face local part feature information (e.g., eye feature information, chin feature information, etc.).

Step 405: transmitting the voiceprint feature information to the server, transmitting the generated human face feature information, lip part feature information sequence, and human face local part feature information sequence to the server, and receiving an identity authentication result returned by the server.

In the present embodiment, the electronic device may transmit the generated voiceprint feature information, human face feature information, lip part feature information sequence, and human face local part feature information sequence to a server (e.g., the server 105 shown in FIG. 1), and receive the identity authentication result returned from the server.

In practice, the server may pre-store a target voiceprint feature information, a target human face feature information, a target lip part feature information sequence, and a target human face local part feature information sequence of the user. The electronic device may generate an identity authentication result for characterizing that the user passes the identity authentication when the following four conditions are simultaneously satisfied: the human face feature information matches the target human face feature information; the lip part feature information sequence matches the target lip part feature information sequence; the human face local part feature information sequence matches the target human face local part feature information sequence; and the voiceprint feature information matches the target voiceprint feature information.

In some optional implementations of the present embodiment, prior to acquiring the video data displaying a lip part mouth shape changing process of the user, the electronic device may also execute the following steps:

First, displaying second prompt information for prompting the user to set a code word, and acquiring target video data displaying the lip part mouth shape changing process of the user. Optionally, after displaying the second prompt information, the electronic device may photograph the face part of the user to acquire target video data displaying a lip part mouth shape changing process of the user and acquire the target voice data of the user generated during the video recording process as well. Here, the second prompt information may also include a Pronounce option. After the electronic device determines that the user performs a click operation on the Pronounce option, the target voice data may be parsed to generate target voiceprint feature information. It needs to be noted that the method of generating the target voiceprint feature information is substantially identical to the method of generating the voiceprint feature information in step 402, which is not detailed here.

Then, parsing the target video data to generate target annotation information of a human face region displayed by each image in target consecutive images constituting the target video data and target human face feature information corresponding to each image in the target consecutive images. Here, the method of generating the target annotation information and the target human face feature information is substantially identical to the method of generating the annotation information and human face feature information in the step 403, which is not detailed here.

Next, generating a target lip part feature information sequence and a target human face local part feature information sequence based on the generated target annotation information and the target consecutive images, wherein the target annotation information may include positions of critical points of a human face region and a position of the human face region. The electronic device may input the generated target annotation information and the target consecutive images into a pre-trained neural network, respectively, obtaining the target lip part feature information sequence and the target human face local part feature information sequence which correspond to the target consecutive images. Here, the method of generating the target lip part feature information sequence and the target human face local part feature information sequence is substantially identical to the method of generating the lip part feature information sequence and the human face local part feature information sequence in step 404, which is not detailed here.

Finally, transmitting the generated target human face feature information, the target lip part feature information sequence, and the target human face local part behavior feature information sequence to the server. It needs to noted that if the target voiceprint feature information is generated, the target voiceprint feature information may be simultaneously transmitted to the server.

It needs to be noted that the server may match the voiceprint feature information, the human face feature information, the lip part feature information sequence, and the human face local part feature information sequence with the target voiceprint feature information, the target human face feature information, the target lip part feature information sequence, and the target human face local part feature information sequence using various kinds of matching modes. As an example, the server may store four neural networks for performing voiceprint recognition, human face recognition, lip part behavior recognition, and human face local part behavior recognition, respectively. The server may input the voiceprint feature information, the human face feature information, the lip part feature information sequence, and the human face local part feature information sequence into the corresponding neural networks, respectively, obtaining a voiceprint recognition result, a human face recognition result, a lip part behavior recognition result, and a human face local part behavior recognition result outputted by the four neural networks, respectively. It needs to be noted that the four neural networks may be obtained by supervised training based on a considerable number of training samples using a machine learning method. The training samples used by the neural network for voiceprint recognition may include the target voiceprint information; the training samples used by the neural network for human face recognition may include the target human face feature information; the training samples used by the neural network for lip part behavior recognition may include the target lip part feature information sequence; and the training samples used by the neural network for performing human face local part behavior recognition may include the target human face local part feature information sequence. It needs to be noted that the number of neural networks for performing the voiceprint recognition, the human face recognition, the lip part behavior recognition, and the human face local part behavior recognition is not limited to four, which may also be one, two or more.

It needs to be noted that if the user does not select a Pronounce option during the process of setting a code word, the click operation on the Pronounce option is usually not performed during the process of identity authentication.

It may be seen from FIG. 4 that compared with the embodiment corresponding to FIG. 2, the flow 400 of the identity authentication method in the present embodiment highlights the step of extracting voiceprint feature information and the step of performing identity authentication in conjunction with the voiceprint feature information. Therefore, the solution described in the present embodiment may perform identity identification in conjunction with more biometrics; besides, the voiceprint feature information is difficult to mimic, which further enhances the security of identity identification.

Figure 5:
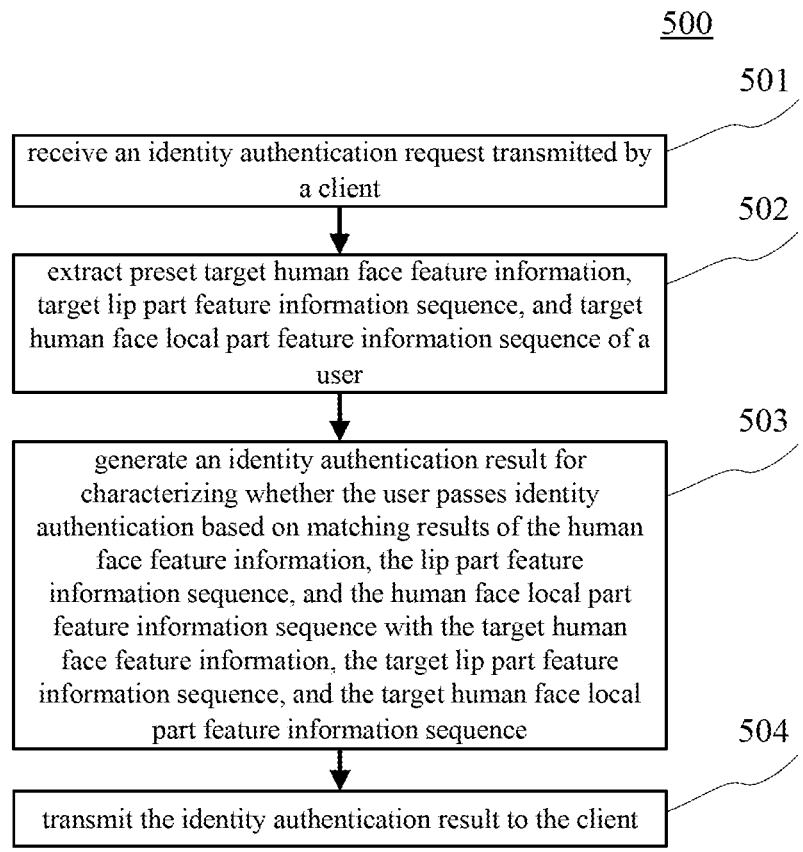
FIG. 5 is a flow diagram of a further embodiment of the identity authentication method according to the present disclosure.

Continue referring to FIG. 5, which shows a flow 500 of an embodiment of an identity authentication method of the present disclosure. The identity authentication method comprises steps of:

Step 501: receiving an identity authentication request transmitted by a client.

In the present embodiment, an electronic device (e.g., the server 105 shown in FIG. 1) on which the identity authentication method is executed may receive an identity authentication request transmitted by a client (e.g., the terminal 101, 102, 103 shown in FIG. 1) over a wired connection manner or a wireless connection manner, wherein the identity authentication request includes a user's human face feature information, lip part feature information sequence, and human face local part feature information sequence, wherein the human face feature information, the lip part feature information sequence, and the human face local part feature information sequence are generated by the client based on parsing of the video data displaying the user's lip part mouth shape changing process. It needs to be noted that the wireless connection manner includes, but not limited to, a 3G/4G connection, a WiFi connection, a Bluetooth connection, a WiMAX connection, a Zigbee connection, a UWB (ultra wideband) connection, and other existing known or future developed wireless connection manner.

Step 502: extracting preset target human face feature information, target lip part feature information sequence, and target human face local part feature information sequence of a user.

In the present embodiment, the electronic device may extract the preset target human face feature information, target lip part feature information sequence, and target human face local part feature information sequence of the user. In practice, the electronic device may pre-store target human face feature information, target lip feature information sequence, and target human face local part feature information sequence of a considerable amount of users. After receiving an identity authentication request, the electronic device may directly retrieve from the stored information.

Step 503: generating an identity authentication result for characterizing whether the user passes identity authentication based on matching results of the human face feature information, the lip part feature information sequence, and the human face local part feature information sequence with the target human face feature information, the target lip part feature information sequence, and the target human face local part feature information sequence.

In the present embodiment, the electronic device may generate an identity authentication result for characterizing whether the user passes identity authentication based on matching results of the human face feature information, the lip part feature information sequence, and the human face local part feature information sequence with the target human face feature information, the target lip part feature information sequence, and the target human face local part feature information sequence.

Here, the electronic device may match the human face feature information, the lip part feature information sequence, and the human face local part feature information sequence with the target human face feature information, the target lip part feature information sequence, the target human face local part feature information sequence using various kinds of matching modes. As an example, the electronic device may store three neural networks for performing human face recognition, lip part behavior recognition, and human face local part behavior recognition, respectively. The electronic device may input the human face feature information, the lip part feature information sequence, and the human face local part feature information sequence into corresponding neural networks, obtaining a human face recognition result, a lip part behavior recognition result, and a human face local part behavior recognition result outputted by the three neural networks, respectively. It needs to be noted that the human face recognition result, lip part behavior recognition result, and human face local part behavior recognition result may be three values. If the human face recognition result is greater than a first threshold preset by technicians in the art based on mass data statistics, it may be determined that the human face feature information matches the target human face feature information. If the lip part behavior recognition result is greater than a second threshold preset by technicians based on mass data statistics, it may be determined that the lip part feature information sequence matches the target lip part feature information sequence. If the human face local part behavior recognition result is greater than a third threshold preset by technicians based on mass data statistics, it may be determined that the human face local part feature information sequence matches the target human face local part feature information sequence.

It needs to be noted that the three neural networks may be derived from supervised training based on mass training samples using a machine learning method. The training samples used by the neural network for performing human face recognition may include the target human face feature information; the training samples used by the neural network for performing lip part behavior recognition may include the target lip part feature information sequence; the training samples used by the neural network for performing human face local part behavior recognition may include the target human face local part feature information sequence. It needs to be noted that the number of neural networks for performing human face recognition, lip part behavior recognition, and human face local part behavior recognition is not limited to 3, but may also be one, two or more.

In some optional implementations of the present embodiment, the electronic device may generate an identity authentication result for characterizing that the user passes identity authentication when the following conditions are simultaneously satisfied: the human face feature information matches the target human face feature information; the lip part feature information sequence matches the target lip part feature information sequence; and the human face local part feature information sequence matches the target human face local part feature information sequence.

In some optional implementations of the present embodiment, the identity authentication request may further include voiceprint feature information of the user. The electronic device may also extract preset target voiceprint feature information of the user; and generate an identity authentication result for characterizing that the user passes identity authentication when the following four conditions are simultaneously satisfied: the human face feature information matches the target human face feature information; the lip part feature information sequence matches the target human face local part feature information sequence; and the voiceprint feature information matches the target voiceprint feature information.

In some optional implementations of the present embodiment, prior to the receiving an identity authentication request transmitted by the client, the electronic device may further receive an identity setting request transmitted by the client, wherein the identity setting request may include the user' target human face feature information, target lip part feature information sequence, and target human face local part feature information sequence, the target human face feature information, the target lip part feature information sequence, and the target human face local part feature information sequence being generated by the client based on parsing of the target video data displaying the lip part mouth shape changing process of the user. Then, the electronic device may store the target human face feature information, the target lip part feature information sequence, and the target human face local part feature information sequence.

In some optional implementations of the present embodiment, the identity setting request further includes target voiceprint feature information of the user, wherein the target voiceprint feature information is generated by the client based on parsing of the voice data of the user. The electronic device may store the target voiceprint feature information, the target human face feature information, the target lip part feature information sequence, and the target human face local part feature information sequence.

Step 504: transmitting the identity authentication result to the client.

In the present embodiment, the electronic device may transmit the identity authentication result to the client.

With the method provided by the embodiments of the present disclosure, by matching the human face feature information, lip part feature information sequence, and human face local part feature information sequence in the identity authentication request transmitted by the client with the preset target human face feature information, target lip part feature information sequence, and target human face local part feature information sequence of the user, respectively, then generating an identity authentication result for characterizing whether the user passes the identity authentication based on the matching results, and finally transmitting the identity authentication result to the client, user identity authentication may be performed in conjunction with facial recognition of a human face, recognition of mouth shape motions when the user uses the lip language, and recognition of face local part behaviors when the user uses the lip language; it is difficult for a hacker to imitate the mouth shape motions and the face part behaviors because these are biometrics unique to the user when he uses lip language, and thus the security of identity authentication is enhanced.

Figure 6:
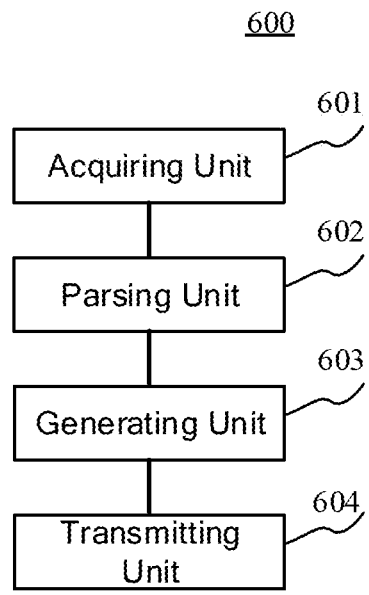
FIG. 6 is a structural schematic diagram of an embodiment of an identity authentication apparatus according to the present disclosure.

Further refer to FIG. 6. As an implementation of the method shown in FIG. 2, the present application provides an embodiment of an identity authentication apparatus. The apparatus embodiment corresponds to the method apparatus shown in FIG. 2; the apparatus may be specifically applied in various electronic devices.

As shown in FIG. 6, the identity authentication apparatus 600 according to the present embodiment comprises: an acquiring unit 601 configured to acquire video data displaying a lip part mouth shape changing process of a user; a parsing unit 602 configured to parse the video data to generate annotation information of a human face region displayed by each image in consecutive images constituting the video data and human face feature information corresponding to each image in the consecutive images; a generating unit 603 configured to generate a lip part feature information sequence and a human face local part feature information sequence based on the generated annotation information and the consecutive images; and a transmitting unit 604 configured to transmit the generated human face feature information, the lip part feature information sequence, and the human face local part feature information sequence to a server, and receive an identity verification result returned from the server.

With the apparatus provided by the embodiments of the present disclosure, by the parsing unit 602 parsing the video data displaying the user lip part mouth shape changing process acquired by the acquiring unit 601 to generate annotation information and human face feature information, and then the generating unit 603 generating a lip part feature information sequence and a human face local part feature information sequence based on the generated annotation information and consecutive images, and finally the transmitting unit 604 transmitting the generated human face feature information, lip part feature information sequence, and human face local part feature information sequence to the server, and receiving an identity authentication result returned by the server, user identity authentication may be performed in conjunction with facial recognition of a human face, recognition of mouth shape motions when the user uses the lip language, and recognition of face local part behaviors when the user uses the lip language; it is difficult for a hacker to imitate the mouth shape motions and the face part behaviors because these are biometrics unique to the user when he uses lip language, and thus the security of identity authentication is enhanced.

Figure 7:
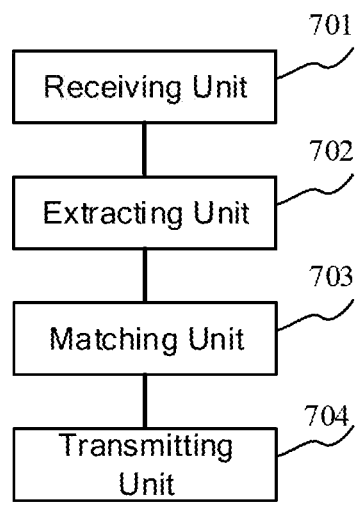
FIG. 7 is a structural schematic diagram of a further embodiment of the identity authentication apparatus according to the present disclosure.

Further refer to FIG. 7. As an implementation of the method shown in FIG. 5, the present application provides an embodiment of an identity authentication apparatus. The apparatus embodiment corresponds to the method embodiment shown in FIG. 5; the apparatus specifically may be applied to various electronic devices.

As shown in FIG. 7, the identity authentication apparatus 700 of the present embodiment comprises: a receiving unit 701 configured to receive an identity authentication request transmitted by a client, wherein the identity authentication request includes a user's human face feature information, lip part feature information sequence, human face local part feature information sequence, which human face feature information, lip part feature information sequence, human face local part feature information sequence, are generated based on parsing of the video data displaying the user's lip part mouth shape change process; an extracting unit 702 configured to extract preset target human face feature information, target lip part feature information sequence, and target human face local part feature information sequence of the user; a matching unit 703 configured to generate an identity authentication result characterizing whether the user passes identity authentication based on matching results of the human face feature information, the lip part feature information sequence, and the human face local part feature information sequence with the target human face feature information, target lip part feature information sequence, and target human face local part feature information sequence; and a transmitting unit 704 configured to transmit an identity authentication result to the client.

By the matching unit 703 matching the human face feature information, the lip part feature information sequence, the human face local part feature information sequence received by the receiving unit 701 with the target human face feature information, the target lip part feature information sequence, and the target human face local part feature information sequence extracted by the extracting unit 702, respectively so as to generate an identity authentication result for characterizing whether the user passes identity authentication based on the matching results, and then the transmitting unit 704 transmitting the identity authentication result to the client, the apparatus provided by the embodiment of the present disclosure may perform user identity authentication in conjunction with the face recognition of the human face, recognition of the mouth shape motions when the user uses the lip language, and recognition of the facial local part behavior when the user uses the lip language; it is difficult for a hacker to imitate the mouth shape motions and the face part behaviors because these are biometrics unique to the user when he uses lip language, and thus the security of identity authentication is enhanced.

Hereinafter, refer to FIG. 8, which is a structural schematic diagram of a computer system 800 of a terminal device or a server adapted for implementing embodiments of the present disclosure. The terminal device/server shown in FIG. 8 is only an example, which should not bring about any limitation to the function or scope of use of the embodiments of the present disclosure.

Figure 8:
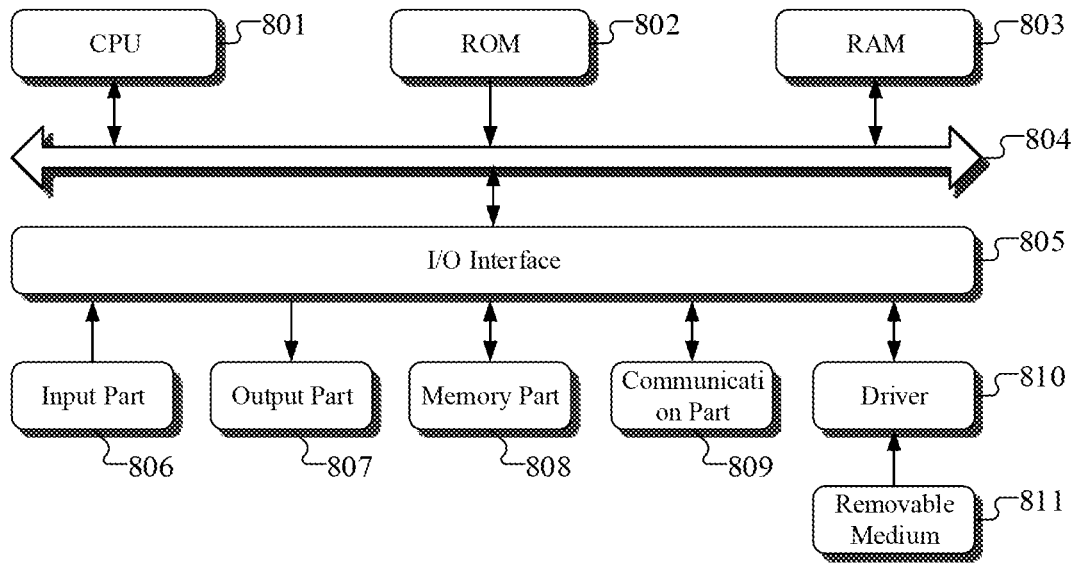
FIG. 8 is a structural schematic diagram of a computer system of a terminal device or a server adapted for implementing embodiments of the present disclosure.

As shown in FIG. 8, the computer system 800 comprises a central processing unit (CPU) 801 which may perform various kinds of appropriate actions and processing according to computer program stored in a read-only memory (ROM) 802 or computer program loaded into the random-access memory (RAM) 803 from a memory part 808. In RAM 803, there may also store various kinds of programs and data needed for operations of the system 800. CPU 801, ROM 802, and RAM 803 are connected with each other via a bus 804. The input/output (I/O) interface 805 may also be connected to the bus 804.

A plurality of components are connected to the I/O interface 805, comprising: an input part 806 including such as a camera, and etc.; an output part 807 including such as an LCD (Liquid Crystal Display), and a loudspeaker, etc.; a memory part 808 including a hard disk, etc.; and a communication part 809 including a network interface card such as a LAN (Local Area Network) card, a modem, etc. The communication part 809 performs communication processing via a network such as the Internet. A driver 810 is also connected to the I/O interface 805 as needed. A removable medium 811, such as a magnetic disk, an optical disk, a magneto-optical disk, and a semiconductor memory, etc., is mounted on the driver 810 as needed, so as to facilitate the computer program read therefrom to be installed in the memory part 808.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 809 and/or installed from the removable medium 811. When being executed by the central processing unit (CPU) 801, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program code embodied on the computer-readable medium may be transmitted using any appropriate medium, including, but not limited to: wireless, wired, cable, RF, etc., or any appropriate combination thereof.

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising an acquiring unit, a parsing unit, a generating unit, and a transmitting unit. Particularly, names of these units do not constitute limitations to those units. For example, the acquiring unit may also be described as "a unit that acquires video data displaying a lip part mouth shape changing process of a user."

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: acquire video data displaying a lip part mouth shape changing process of a user; parse the video data to generate annotation information of a human face region displayed by each image in consecutive images constituting the video data and human face feature information corresponding to each image in the consecutive images; generate a lip part feature information sequence and a human face local part feature information sequence based on the generated annotation information and the consecutive images; transmit the generated human face feature information, the lip part feature information sequence, and the human face local part feature information sequence to a server, and receive an identity verification result returned from the server.

What have been described above are only preferred embodiments of the present disclosure and an illustration of the technical principle as exerted. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. An identity authentication method, comprising:
   acquiring video data displaying a lip part mouth shape changing process of a user, wherein the acquiring video data displaying a lip part mouth shape changing process of a user comprises: displaying first prompt information for prompting the user to perform identity authentication, photographing a face part of the user to acquire the video data displaying the lip part mouth shape changing process of the user, and acquiring voice data of the user;
   parsing the video data to generate annotation information of a human face region displayed by each image in consecutive images constituting the video data and human face feature information corresponding to each image in the consecutive images;
   generating a lip part feature information sequence and a human face local part feature information sequence based on the generated annotation information and the consecutive images; and
   transmitting the generated human face feature information, the lip part feature information sequence, and the human face local part feature information sequence to a server, and receiving an identity verification result returned from the server, wherein the first prompt information includes a Pronounce option, and wherein the method further comprises:
   parsing the voice data in response to determining that the user performs a click operation on the Pronounce option to generate voiceprint feature information; and
   transmitting the voiceprint feature information to the server.

2. The identity authentication method according to claim 1, wherein the annotation information includes positions of critical points of the human face region and a position of the human face region, and wherein the generating a lip part feature information sequence and a human face local part feature information sequence based on the generated annotation information and the consecutive images comprises:
   inputting the generated annotation information and the consecutive images into a pre-trained neural network to obtain the lip part feature information sequence and the human fac local part feature information sequence, which correspond to the consecutive images, wherein the neural network is for extracting lip part feature information successively from a plurality of images to generate the lip part feature information sequence, and extracting human face local part feature information successively from the plurality of images to generate the human face local part feature information sequence.

3. The identity authentication method according to claim 1, wherein the human face local part feature information sequence includes at least one of: a face part feature information sequence, an eye feature information sequence, a nose feature information sequence, an eyebrow feature information sequence, a jaw feature information sequence, an oral cavity feature information sequence, and a tongue part feature information sequence.

4. The identity authentication method according to claim 1, wherein the lip part feature information in the lip part feature information sequence includes at least one of: central coordinate of a lip, direction of the lip, an inner lip width, an outer lip width, an outer lip upper edge height, an inner lip upper edge height, an inner lip lower edge height, an outer lip lower edge height, an offset amount of a quartic curve center from a coordinate origin, an offset distance of the upper lip part quartic curve from a parabola, and an offset distance of the lower lip part quartic curve from the parabola.

5. The identity authentication method according to claim 1, further comprising, prior to acquiring video data displaying a lip part mouth shape changing process of a user,
displaying second prompt information prompting the user to set a code word and acquiring target video data displaying the lip part mouth shape changing process of the user;
parsing the target video data to generate target annotation information of the human face region displayed by each image in target consecutive images constituting the target video data and target human face feature information corresponding to each image in the target consecutive images;
generating a target lip part feature information sequence and a target human face local part feature information sequence based on the generated target annotation information and the target consecutive images; and
transmitting the generated target human face feature information, target lip part feature information sequence, and the target human face local part feature information sequence to the server.

6. The identity authentication method according to claim 5, wherein the displaying second prompt information prompting the user to set a code word and acquiring target video data displaying the lip part mouth shape changing process of the user comprises:
displaying the second prompt information that prompts the user to set the code word, photographing the face part of the user to acquire target video data displaying the lip part mouth shape changing process of the user, and acquiring the target voice data of the user.

7. The identity authentication method according to claim 6, wherein the second prompt information includes a Pronounce option, and wherein the method further comprises:
parsing the target voice data in response to determining that the user performs a click operation on the Pronounce option in the second prompt information to generate target voiceprint feature information; and
transmitting the target voiceprint feature information to the server.

8. The identity authentication method according to claim 5, wherein the target annotation information includes the positions of critical points of the human face region and the position of the human face region, and wherein the generating a target lip part feature information sequence and a target human face local part feature information sequence based on the generated target annotation information and the target consecutive images comprises:
inputting the generated target annotation information and the target consecutive images into the pre-trained neural network, respectively, obtaining the target lip part feature information sequence and the target human face local part feature information sequence corresponding to the target consecutive images.

9. A terminal device, comprising:
one or more processors; and
a storage storing one or more programs which, when being executed by the one or more processors, cause the one or more processors to:
acquire video data displaying a lip part mouth shape changing process of a user, wherein the acquiring video data displaying a lip part mouth shape changing process of a user comprises: displaying first prompt information for prompting the user to perform identity authentication, photographing a face part of the user to acquire the video data displaying the lip part mouth shape changing process of the user, and acquiring voice data of the user;
parse the video data to generate annotation information of a human face region displayed by each image in consecutive images constituting the video data and human face feature information corresponding to each image in the consecutive images;
generate a lip part feature information sequence and a human face local part feature information sequence based on the generated annotation information and the consecutive images; and
transmit the generated human face feature information, the lip part feature information sequence, and the human face local part feature information sequence to a server, and receive an identity verification result returned from the server, wherein the first prompt information includes a Pronounce option, and wherein the method further comprises:
parsing the voice data in response to determining that the user performs a click operation on the Pronounce option to generate voiceprint feature information; and
transmitting the voiceprint feature information to the server.

10. A non-transitory computer-readable storage medium having a computer program embodied thereon, wherein the computer program, when being executed by a processor, causes the processor to:
acquire video data displaying a lip part mouth shape changing process of a user, wherein the acquiring video data displaying a lip part mouth shape changing process of a user comprises: displaying first prompt information for prompting the user to perform identity authentication, photographing a face part of the user to acquire the video data displaying the lip part mouth shape changing process of the user, and acquiring voice data of the user;
parse the video data to generate annotation information of a human face region displayed by each image in consecutive images constituting the video data and human face feature information corresponding to each image in the consecutive images;
generate a lip part feature information sequence and a human face local part feature information sequence based on the generated annotation information and the consecutive images; and
transmit the generated human face feature information, the lip part feature information sequence, and the human face local part feature information sequence to a server, and receive an identity verification result returned from the server, wherein the first prompt information includes a Pronounce option, and wherein the method further comprises:

parsing the voice data in response to determining that the user performs a click operation on the Pronounce option to generate voiceprint feature information, and transmitting the voiceprint feature information to the server.

\* \* \* \* \*